United States Patent [19]
Michalczyk et al.

[11] Patent Number: 5,876,686
[45] Date of Patent: *Mar. 2, 1999

[54] PROCESS FOR MAKING INORGANIC OXIDE GELS IN FLUOROCARBON SOLVENTS

[75] Inventors: Michael Joseph Michalczyk, Wilmington, Del.; Kenneth George Sharp, Landenburg, Pa.

[73] Assignee: E. I. du Pont de Nemours and Company, Wilmington, Del.

[ * ] Notice: The term of this patent shall not extend beyond the expiration date of Pat. No. 5,726,247.

[21] Appl. No.: 663,833

[22] Filed: Jun. 14, 1996

Related U.S. Application Data

[60] Provisional application No. 60/000,576 Jun. 28, 1995.

[51] Int. Cl.$^6$ .......................... C01B 13/14; C01B 33/12; C01B 35/10; B32B 27/00
[52] U.S. Cl. .......................... 423/592; 423/338; 423/278; 423/618; 423/608; 423/609; 423/625; 423/610; 423/593; 428/421; 428/441; 428/442; 428/492; 428/520; 428/537.1
[58] Field of Search ..................................... 423/338, 278, 423/618, 608, 609, 625, 610, 593, 592; 428/421, 441, 442, 492, 520, 537.1

[56] References Cited

U.S. PATENT DOCUMENTS

| | | | |
|---|---|---|---|
| 4,808,397 | 2/1989 | Albizzati et al. | 423/338 |
| 5,076,980 | 12/1991 | Nogues et al. | 423/338 |
| 5,158,758 | 10/1992 | Chieng et al. | 423/338 |
| 5,180,845 | 1/1993 | Higley | 556/445 |
| 5,206,189 | 4/1993 | Caldwell | 423/338 |
| 5,304,364 | 4/1994 | Costa et al. | 423/338 |
| 5,378,790 | 1/1995 | Michalczyk et al. | 528/35 |
| 5,441,718 | 8/1995 | Sharp | 423/338 |
| 5,442,011 | 8/1995 | Halling | 524/873 |
| 5,527,871 | 6/1996 | Tani et al. | 423/618 |
| 5,726,247 | 3/1998 | Michalczyk et al. | 428/421 |

FOREIGN PATENT DOCUMENTS

| | | |
|---|---|---|
| 0 166 363 A2 | 1/1986 | European Pat. Off. . |
| 0 545 201 A3 | 6/1993 | European Pat. Off. . |
| 0 574 928 A2 | 12/1993 | European Pat. Off. . |
| WO 92/10309 | 6/1992 | WIPO . |

*Primary Examiner*—Steven Bos

[57] ABSTRACT

This invention relates to a process for the preparation of an inorganic oxide gel comprising contacting at least one fluorinated inorganic oxide precursor with a fluorinated gelling agent in the presence of at least one fluorinated solvent to form a solution; allowing sufficient time for gelation to occur; and isolating the inorganic oxide gel. Gels made by this process are useful as coatings and as components in inorganic/organic hybrid materials.

15 Claims, No Drawings

PROCESS FOR MAKING INORGANIC OXIDE GELS IN FLUOROCARBON SOLVENTS

This application claims the priority benefit of U.S. Provisional Application 60/000,576, filed Jun. 28, 1995.

FIELD OF THE INVENTION

This invention concerns a process for conducting sol-gel chemistry in a fluorinated organic solvent.

BACKGROUND OF THE INVENTION

Polysilicate or other inorganic oxide networks and particles can be generated from molecular precursors through room temperature hydrolytic and condensation sol-gel reactions. Such reactions generally require cosolvents for the essential reactants water and the molecular precursor compound, such as a tetraalkoxysilane, and are catalyzed by either acid or base.

U.S. Pat. No. 5,441,718 describes a process for making an inorganic gel comprising mixing specific non-fluorinated inorganic oxide precursors with particular carboxylic acids.

European Patent Application 0 574 928 A2 describes the synthesis of fluorosilicone resin by the hydrolysis of a perfluoroalkyl-containing silane of the formula $F(CF_2)_a CH_2CH_2SiY_3$, wherein Y is chlorine, bromine or $C_1$ to $C_4$ alkoxy, after being dissolved in an organic solvent and subsequently dripped into aqueous acid. Additional water or organic solvent is added thereafter and later an aqueous layer removed.

The process of the present invention concerns hydrolysis and condensation of inorganic oxide precursors in a fluorinated solvent. Fluorinated solvents have not previously been used for such processes due to their incompatability with water, catalysts and inorganic oxide precursors.

It is desirable to generate hybrid inorganic and fluoropolymer materials with very small inorganic domains (<75 nm) so as to improve the durability of the fluoropolymer. It is well known that small inorganic particles can be generated via sol-gel chemistry. However, such chemistry is not practiced in perfluorinated solvent systems which are essential for dissolving said fluoropolymers.

SUMMARY OF THE INVENTION

The present invention provides a process for the preparation of an inorganic oxide gel, comprising the steps of:

(a) contacting at least one fluorinated inorganic oxide precursor with a fluorinated gelling agent, and optionally a compound not soluble by itself in a fluorinated solvent, in the presence of at least one fluorinated solvent to form a solution;

(b) allowing sufficient time for gelation to occur; and (c) isolating the inorganic oxide gel.

DETAILED DESCRIPTION

The fluorinated solvents of the present invention are non-solvents for conventional reactants such as water, inorganic oxide precursors such as tetraethoxysilane, and acidic or basic catalysts which are generally used to promote network formation chemistry. The present invention provides chemistry to enable certain inorganic oxide precursors described herein to react and polymerize in a fluorinated solvent medium in the presence of a gelling agent soluble in a fluorinated solvent yielding an inorganic oxide gel.

The inorganic oxide precursors and the gelling agents of the present invention must be soluble in a fluorinated solvent which solvent can be either polyfluorinated or perfluorinated, preferably perfluorinated. Perfluoro aliphatic (e.g., perfluoro(butyl THF)), polyfluoro aliphatic (e.g, $C_3F_7OCHFCF_3$) and perfluoroaromatic (e.g., hexafluorobenzene) solvent systems can be utilized. Preferred solvents comprise perfluoro(butyl THF), e.g., "FLUORINERT" FC-75; "FLUORINERT" FC-40, a complex mixture of perfluorotrialkylamines containing mostly perfluoro(di(n-butyl)methylamine; perfluorophenanthrene, e.g., "FLUTEC" PP-11; $C_3F_7OCHFCF_3$, e.g., "FREON" E1; hexafluorobenzene $(C_6F_6)$; perfluoromethylcyclohexane, $C_6F_{11}(CF_3)$; and perfluoro(n-ethylmorpholine).

The particular fluorinated gelling agent and the fluorinated inorganic oxide precursor together with the optional compound not soluble by itself in a fluorinated solvent, selected for the preparation of the inorganic gel must be soluble in or miscible with a common fluorinated solvent system. Preferably, the fluorinated solvent used to dissolve the at least one inorganic oxide precursor, and optional compound not soluble by itself in the fluorinated solvent, will be the same as the fluorinated solvent used, if any, to dissolve the fluorinated gelling agent.

The process of the present invention can function with these highly fluorinated solvent systems because water is not necessary as an initial reagent and a strong carboxylic acid, such as trifluoroacetic (TFA), which is readily soluble in the fluorinated solvents of interest, can promote the gelation of the fluorinated inorganic oxide precursors described herein without additional catalysts.

The gelling agent which is fluorinated is preferably a strong organic carboxylic acid which is soluble in a fluorinated solvent. Suitable carboxylic acids are trifluoroacetic acid (TFA), perfluoropropionic acid, and trifluoromethanesulfonic acid. Substituted guanidium fluoride can also be used as the fluorinated gelling agent.

Compounds of aluminum, boron, germanium, silicon, tin, titanium and zirconium can be useful as inorganic oxide precursors in the present invention. However, since the at least one inorganic oxide precursor of the present invention must be soluble in a fluorinated solvent, at least one inorganic oxide precursor will necessarily contain fluorinated groups.

The inorganic oxide precursor can comprise compounds having the formula $(R_fC_aH_{2a}O)_nMR_{4-n}$, wherein M is Ge, Si or Sn or $(R_fC_aH_{2a}O)_nM'R_{4-n}(HOR)_q$, wherein M' is Ti or Zr and q is 0 or 1; a is 1 to 4; and n is 2, 3 or 4, and $R_f$ and R are as defined in formula I below. The inorganic oxide precursor can also comprise a compound having the formula $(R_fC_aH_{2a}O)_nM''R_{3-n}'$, wherein: M'' is Al or B; n' is 1, 2 or 3; and a, $R_f$ and R are as defined in formula I below.

The inorganic oxide precursor can further comprise a chelating compound having the formula $(R_fC_aH_{2a}O)_{n'''}M'''^{cn}D^d{}_p$ wherein: M''' is Al, Ti or Zr; D is a chelating ligand, optionally fluorinated; cn is an aluminum, titanium or zirconium coordination number, being in each case an integer having a value of 4–6; d is a number, either 2 or 3, corresponding to the chelating ability of the ligand D, d being 2 for a bidentate ligand and 3 for a tridentate ligand; p is either 1, 2 or 3, except that for d=3, p always is 1; n'' is cn–(d×p); and a and $R_f$ are as defined in formula I below. Chelating compounds suitable for use in the present invention are chemicals containing chelating ligands are those which are capable of bonding to aluminum, titanium, or zirconium through two or more oxygen atoms. Illustrative of compounds containing bidentate chelating ligands are those which are derived from 1,1,1,5,5,5-hexafluoro-2,4-pentanedione. Illustrative of compounds containing tridentate chelating ligands is triethanolamine. Representative examples are Ti(OCH$_2$R$_f$)$_4$, Al(OCH$_2$R$_f$)$_3$ and Al(CF$_3$C(O)CHC(O)CF$_3$)(OCH$_2$R$_f$).

Linear and branched fluoroalcohols can be used in the preparation of compounds useful in the present invention. Preferably, various fluorine-bearing silanes are used as the inorganic oxide precursors in the formation of the inorganic oxide gel. The silanes can be substituted, for example, with polyfluoroalkoxy groups or fluoroalkyl groups. The silanes can be di-, tri- and tetrafunctional molecules, dioxolanes, or "star" compounds which have multiple arms terminating in di- or trifluoroalkoxy functionality.

Preferably, the at least one inorganic oxide precursor is selected from the group consisting of a compound of formula I, II, IIA, III, IIIA, IV, V, VA and VI as described below:

I: a compound having the formula

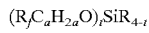
(R$_f$C$_a$H$_{2a}$O)$_t$SiR$_{4-t}$   (I)

wherein:
R$_f$ has up to about 18 carbon atoms and is selected from the group consisting of:
(a) C$_1$ to about C$_{18}$ perfluoroalkyl;
(b) —[CF$_2$CF(CF$_3$)O]$_r$—CF$_2$—CF$_2$—CF$_3$, wherein r is an integer of at least 1;
(c) —CF$_2$—(CF$_2$—O)$_q$—CF$_3$, wherein q is an integer of at least 2; and
(d) —CH$_2$—C(CF$_3$)$_2$—CF$_2$—CF$_2$—CF$_3$;
each R$_f$ optionally substituted with one or more hydrogen;
R is selected from the group consisting of:
hydrogen, C$_1$ to about C$_8$ alkyl, C$_a$H$_{2a}$R$_f$, C$_1$ to about C$_8$ alkoxy, C$_1$ to about C$_{10}$ carboxy, C$_1$ to about C$_{10}$ fluorocarboxy, C$_2$ to about C$_8$ alkenyl, C$_2$ to about C$_8$ alkynyl, C$_6$H$_5$, aryl, and aralkyl;
t is 1, 2, 3 or 4; and
a is an integer from 1 to about 10;

II: a compound having the formula:

X(Si(OC$_a$H$_{2a}$R$_f$)$_3$)$_n$   (II)

wherein:
X is at least one organic link selected from the group consisting of:
(a) R$^1_m$SiY$_{4-m}$;
(b) ring structures

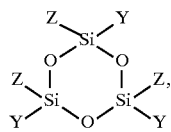
IIb(i)

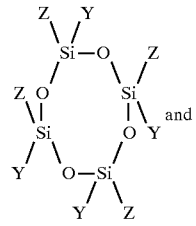
IIb(ii)

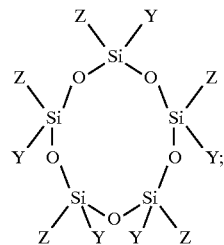
IIb(iii)

(c) R$^1_m$Si(OSi(CH$_3$)$_2$Y)$_{4-m}$;
(d) CH$_3$SiY$_2$OSiY$_2$CH$_3$;
(e) Y$_3$SiOSiY$_3$;
(f) Y$_2$(CH$_3$)Si(CH$_2$)$_b$Si(CH$_3$)Y$_2$;
(g) Y$_3$Si(CH$_2$)$_b$SiY$_3$;
(h) Y$_3$SiC$_6$H$_4$SiY$_3$;
(i) substituted benzene, including all isomers, selected from the group consisting of:
  (i) C$_6$H$_3$(SiZ$_{3-c}$Y$_c$)$_3$;
  (ii) C$_6$H$_2$(SiZ$_{3-c}$Y$_c$)$_4$;
  (iii) C$_6$H(SiZ$_{3-c}$Y$_c$)$_5$; and
  (iv) C$_6$(SiZ$_{3-c}$Y$_c$)$_6$; and
(j) substituted cyclohexane, including all stereoisomers, selected from the group consisting of:
  (i) 1,2-C$_6$H$_{10}$(Y)$_2$; 1,3-C$_6$H$_{10}$(Y)$_2$; 1,4-C$_6$H$_{10}$(Y)$_2$;
  (ii) 1,2,4-C$_6$H$_9$(Y)$_3$; 1,2,3-C$_6$H$_9$(Y)$_3$; 1,3,5-C$_6$H$_9$(Y)$_3$;
  (iii) 1,2,3,4-C$_6$H$_8$(Y)$_4$; 1,2,4,5-C$_6$H$_8$(Y)$_4$; 1,2,3,5-C$_6$H$_9$(Y)$_4$;
  (iv) 1,2,3,4,5-C$_6$H$_7$(Y)$_5$; and
  (v) C$_6$H$_6$(Y)6;
R$_f$ has up to about 18 carbon atoms and is selected from the group consisting of:
(a) C$_1$ to about C$_{18}$ perfluoroalkyl;
(b) —[CF$_2$CF(CF$_3$)O]$_r$—CF$_2$—CF$_2$—CF$_3$, wherein r is an integer of at least 1;
(c) —CF$_2$—(CF$_2$—O)$_q$—CF$_3$, wherein q is an integer of at least 2; and
(d) —CH$_2$—C(CF$_3$)$_2$—CF$_2$—CF$_2$—CF$_3$;
each R$_f$ optionally substituted with one or more hydrogen;
Z is C$_1$ to about C$_4$ alkyl, 3,3,3-trifluoropropyl, aralkyl or aryl;
Y is —(CR$^2$R$^3$)$_k$CR$^4$R$^5$CR$^6$R$^7$(CR$^8$R$^9$)$_h$—
R$^1$ is C$_1$ to about C$_8$ alkyl or aryl;
R$^2$ to R$^9$ are each independently hydrogen, C$_1$ to about C$_8$ alkyl or aryl, provided that at least one of R$^4$ to R$^7$ is hydrogen;
m is 0, 1 or 2;
k and h are each independently an integer from 0 to 10, provided that at least one of k or h is zero;
a is an integer from 1 to about 10;
b is an integer from 1 to about 10;
c is 1, 2 or 3; and
n is an integer greater than or equal to 2;

IIA: a compound having the formula:

 (IIA)

wherein:
X is at least one organic link selected from the group consisting of:
(a) $R^1_m SiY_{4-m}$;
(b) ring structures

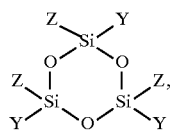 IIAb(i)

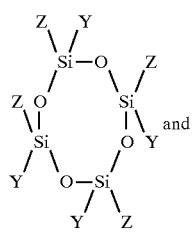 IIAb(ii)

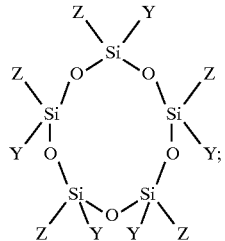 IIAb(iii)

(c) $R^1_m Si(OSi(CH_3)_2 Y)_{4-m}$;
(d) $CH_3 SiY_2 OSiY_2 CH_3$;
(e) $Y_3 SiOSiY_3$;
(f) $Y_2(CH_3)Si(CH_2)_b Si(CH_3)Y_2$;
(g) $Y_3 Si(CH_2)_b SiY_3$;
(h) $Y_3 SiC_6 H_4 SiY_3$;
(i) substituted benzene, including all isomers, selected from the group consisting of:
  (i) $C_6 H_3 (SiZ_{3-c} Y_c)_3$;
  (ii) $C_6 H_2 (SiZ_{3-c} Y_c)_4$;
  (iii) $C_6 H(SiZ_{3-c} Y_c)_5$; and
  (iv) $C_6 (SiZ_{3-c} Y_c)_6$; and
(j) substituted cyclohexane, including all stereoisomers, selected from the group consisting of:
  (i) $1,2-C_6 H_{10}(Y)_2$; $1,3-C_6 H_{10}(Y)_2$; $1,4-C_6 H_{10}(Y)_2$;
  (ii) $1,2,4-C_6 H_9(Y)_3$; $1,2,3-C_6 H_9(Y)_3$; $1,3,5-C_6 H_9(Y)_3$;
  (iii) $1,2,3,4-C_6 H_8(Y)_4$; $1,2,4,5-C_6 H_8(Y)_4$; $1,2,3,5-C_6 H_9(Y)4$;
  (iv) $1,2,3,4,5-C_6 H_7(Y)_5$; and
  (v) $C_6 H_6(Y)_6$;
$R_f$ has up to about 18 carbon atoms and is selected from the group consisting of:
(a) $C_1$ to about $C_{18}$ perfluoroalkyl;
(b) $-[CF_2 CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
Z is $C_1$ to about $C_4$ alkyl, 3,3,3-trifluoropropyl, aralkyl or aryl;

Y is $-(CR^2 R^3)_k CR^4 R^5 CR^6 R^7 (CR^8 R^9)_h-$
$R^1$ is $C_1$ to about $C_8$ alkyl or aryl;
$R^2$ to $R^9$ are each independently hydrogen, $C_1$ to about $C_8$ alkyl or aryl, provided that at least one of $R^4$ to $R^7$ is hydrogen;
$R^{10}$ is $C_1$ to about $C_8$ alkyl or $C_a H_{2a} R_f$; p2 m is 0, 1 or 2;
k and h are each independently an integer from 0 to 10, provided that at least one of k or h is zero;
a is an integer from 1 to about 10;
b is an integer from 1 to about 10;
c is 1, 2 or 3; and
n is an integer greater than or equal to 2;

III: a compound having the formula:

 (III)

wherein:
$R^{13}$ is $C_1$ to about $C_8$ alkyl, $C_1$ to about $C_{10}$ carboxy, $C_1$ to about $C_{10}$ fluorocarboxy, halogen, or $C_a H_{2a} R_f$;
Rf has up to about 18 carbon atoms and is selected from the group consisting of:
(a) $C_1$ to about $C_{18}$ perfluoroalkyl;
(b) $-[CF_2 CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$; p2 each $R_f$ optionally substituted with one or more hydrogen;
a is an integer from 1 to about 10;
v is an even integer from 2 to about 14;
Y is $-(CR^2 R^3)_k CR^4 R^5 CR^6 R^7 (CR^8 R^9)_h-$
$R^2$ to $R^9$ are each independently hydrogen, $C_1$ to about $C_8$ alkyl or aryl, provided that at least one of $R^4$ to $R^7$ is hydrogen; and
k and h are each independently an integer from 0 to 10, provided that at least one of k or h is zero;

IIIA: a compound having the formula:

 (IIIA)

wherein:
$R^{10}$ is $C_1$ to about $C_8$ alkyl or $C_a H_{2a} R_f$;
$R_f$ has up to about 18 carbon atoms and is selected from the group consisting of:
(a) $C_1$ to about $C_{18}$ perfluoroalkyl;
(b) $-[CF_2 CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
a is an integer from 1 to about 10;
v is an even integer from 2 to about 14;
Y is $-(CR^2 R^3)_k CR^4 R^5 CR^6 R^7 (CR^8 R^9)_h-$
$R^{13}$ is $C_1$ to about $C_8$ alkyl, $C_1$ to about $C_{10}$ carboxy, $C_1$ to about $C_{10}$ fluorocarboxy, halogen or $C_a H_{2a} R_f$;
$R^2$ to $R^9$ are each independently hydrogen, $C_1$ to about $C_8$ alkyl or aryl, provided that at least one of $R^4$ to $R^7$ is hydrogen; and
k and h are each independently an integer from 0 to 10, provided that at least one of k or h is zero;

IV: a fluoroalkylphenylsilane having the formula:

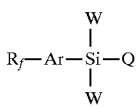

$$R_f-Ar-Si(W)(W)-Q \quad (IV)$$

wherein:
$R_f$ has up to about 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
Ar is a divalent aromatic radical;
W is selected from the group consisting of
(e) $C_1$ to about $C_8$ alkyl;
(f) $R_f-Ar$, wherein each of $R_f$ and Ar is as defined above;
(g) halogen selected from the group consisting of chlorine, bromine and iodine;
(h) $C_1$ to about $C_8$ alkoxy;
(i) $C_1$ to about $C_8$ fluoroalkoxy; and
(j) $C_1$ to about $C_{10}$ carboxy or fluorocarboxy; and
each of Q and T independently is selected from the group consisting of
(k) halogen selected from the group consisting of chlorine, bromine and iodine;
(l) $C_1$ to about $C_8$ alkoxy;
(m) $C_1$ to about $C_8$ fluoroalkoxy; and
(n) $C_1$ to about $C_{10}$ carboxy or fluorocarboxy;
V: a dioxolane having the formula:

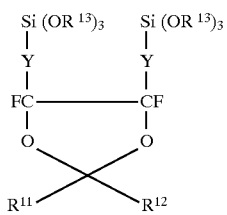

(V)

wherein:
$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;
$R_f$ has up to about 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
a is an integer from 1 to about 10;
Y is $-(CR^2R^3)_k CR^4R^5CR^6R^7(CR^8R^9)_h-$
$R^2$ to $R^9$ are each independently hydrogen, $C_1$ to about C8 alkyl or aryl, provided that at least one of $R^4$ to $R^7$ is hydrogen;
k and h are each independently an integer from 0 to 10, provided that at least one of k or h is zero; and
$R^{11}$ and $R^{12}$ are each independently selected from $C_1$ to $C_3$ fluoroalkyl or fluorine;

VA: a dioxolane having the formula:

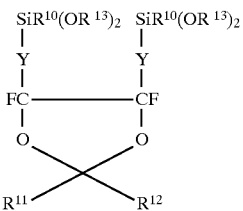

(VA)

wherein:
$R^{10}$ is $C_1$ to about $C_8$ alkyl or $C_aH_{2a}R_f$;
$R_f$ has up to about 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
a is an integer from 1 to about 10;
Y is $-(CR^2R^3)_k CR^4R^5CR^6R^7(CR^8R^9)_h-$
$R^{13}$ to $C_1$ to about $C_8$ alkyl, $C_1$ to about $C_{10}$ carboxy, $C_1$ to about $C_{10}$ fluorocarboxy, halogen or $C_aH_{2a}R_f$;
$R^2$ to $R^9$ are each independently hydrogen, $C_1$ to about $C_8$ alkyl or aryl, provided that at least one of $R^4$ to $R^7$ is hydrogen;
k and h are each independently an integer from 0 to 10, provided that at least one of k or h is zero; and
$R^{11}$ and $R^{12}$ are each independently selected from $C_1$ to $C_3$ fluoroalkyl or fluorine; and VI: a compound having the formula:

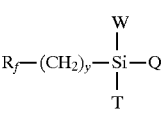

$$R_f-(CH_2)_y-Si(W)(T)-Q \quad (VI)$$

wherein:
Y is an integer from 2 to about 10;
$R_f$ has up to about 18 carbon atoms and is selected from the group consisting of
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
Ar is a divalent aromatic radical;
W is selected from the group consisting of
(e) $C_1$ to about $C_8$ alkyl;
(f) $R_f-Ar$, wherein each of $R_f$ and Ar is as defined above;
(g) halogen selected from the group consisting of chlorine, bromine and iodine;
(h) $C_1$ to about $C_8$ alkoxy; and
(i) $C_1$ to about $C_8$ fluoroalkoxy;
(j) $C_1$ to about $C_{10}$ carboxy or fluorocarboxy; and
each of Q and T independently is selected from the group consisting of
(k) halogen selected from the group consisting of chlorine, bromine and iodine;
(l) $C_1$ to about $C_8$ alkoxy;

(m) $C_1$ to about $C_8$ fluoroalkoxy; and (n) $C_1$ to about $C_{10}$ carboxy or fluorocarboxy.

The $R_f$ group can be a fluoroalkyl or perfluoroalkyl group, which can be either normal or branched, and has up to about 18 carbon atoms, preferably one to eight carbon atoms, especially preferred one to three carbon atoms. Normal perfluoroalkyl groups include, for example, trifluoromethyl, perfluoroethyl, perfluoropropyl, perfluorobutyl, perfluoropentyl, perfluorohexyl, perfluorodecyl, perfluordodecyl, and perfluorooctadecyl. Fluorosilanes of formulas I–VI where $R_f$ has more than eighteen carbon atoms are considered less practical to synthesize, although such fluorosilanes would be perfectly suitable in all applications contemplated for this class of compounds. A typical suitable branched fluoroalkyl group is $-CH_2-C(CF_3)_2-CF_2-CF_2-CF_3$.

The $R_f$ groups also can be certain perfluoro(alkyleneoxy)alkyl)radicals. These include perfluoro(methylene (polymethyleneoxy)methyl) radicals (c) and perfluoro((polyisopropyleneoxy)propyl) radicals (b). One or more of the fluorine on the $R_f$ group can be substituted with hydrogen provided that the compound remains soluble in the fluorinated solvent.

For the fluoroalkoxysilanes of formula I, $R_f$ is preferably a $C_1$ to about $C_8$ perfluoroalkyl group; most preferably, $CF_3$, $C_2F_5$ or $C_3F_7$. R is preferably a lower alkyl of 1 to about 6 carbon atoms or a lower alkoxy group of 1 to about 6 carbon atoms; most preferably methyl, ethyl, methoxy or ethoxy. Preferably n is 3 or 4, and a is preferably 1 or 2, most preferably 1. Preferably the alkenyl group is vinyl or allyl. The preferred aralkyl is benzyl and the preferred aryl is phenyl. Representative examples of inorganic oxide precursor compounds of formula I comprise compounds such as $(CF_3CH_2O)_4Si$ known as tetrakis(trifluoroethoxy)silane (FES); tetrakis(pentafluoropropoxy)silane (FPS); $(n-C_3F_7CH_2O)_4Si$ known as tetrakis(n-heptafluorobutoxy) silane (FBS); and $Si(OCH_2CH_2R_f)_4$, $HSi(OCH_2R_f)_3$, $(CH_3O)_3Si(OCH_2CH_2R_f)$, $(CH_3O)_2Si(OCH_2CH_2R_f)_2$ and $CH_2=CHSi(OCH_2R_f)_3$ wherein $R_f$ is $CF_3$, $C_2F_5$, or $n-C_3F_7$.

For the compounds of formula II and IIA, X is preferably (a) $R^1_mSiY_{4-m}$ or (c) $R^1_mSi(OSi(CH_3)_2Y)_{4-m}$. The most preferred organic link X, is where m is 0, k is 0 or 1, h is 0 or 1, and all of $R^2$ to $R^9$ are hydrogen. $R_f$ is preferably $CF_3$, $C_2F_5$ or $n-C_3F_7$. Z is preferably $CH_3$; the preferred aralkyl being benzyl and the preferred aryl being phenyl; n is preferably 2–6, most preferably 2, 3 or 4; and a is preferably 1 or 2, most preferably 1. Representative examples of the compounds of formula II and IIA comprise those compounds wherein $X=Si(OSi(CH_3)_2CH_2CH_2)_4$ and $R_f=n-C_3F_7$, $C_2F_5$ or $CF_3$; $X=Si(CH_2CH_2)_4$ and $R_f=CF_3$ or $n-C_3F_7$; and X=the ring structures of formula II(b) and IIA(b) wherein $Y=CH_2CH_2$, $Z=CH_3$, and $R_f=n-C_3F_7$, $C_2F_5$ or $CF_3$.

For the compounds of formula III and IIIA, $OR^{13}$ is preferably a fluoroalkoxy group; most preferably $-OCH_2CF_3$, $-OCH_2C_2F_5$, or $-OCH_2C_3F_7$. v is preferably 4, 6, 8 or 10, most preferably 6. Preferably, all of $R^2$ to $R^9$ are hydrogen. Representative examples of compounds of formula III comprise
$(C_3F_7CH_2O)_3Si(CH_2)_2(CF_2)_6(CH_2)_2Si(OCH_2C_3F_7)_3$, $(CF_2)_6((CH_2)_2Si(OCH_2CF_3)_3)_2$, and $(CF_2)_6((CH_2)_2Si(OCH_2CH_3)_3)_2$.

For the compounds of formula IIA, IIIA and VA, $R^{10}$ is preferably $C_1$ to $C_3$ alkyl; most preferably methyl.

For the fluoroalkylphenylsilane compounds of formula IV and the compounds of formula VI, $R_f$ is preferably $n-C_8F_{17}$ or $n-C_{10}F_{21}$.

Ar in formula IV and formula VI above, can be any divalent aromatic radical, as this term is understood in the art, including those comprising six-, ten-, and fourteen-carbon aromatic rings, including, for example, radicals remaining when two ring hydrogen atoms are removed from an aromatic compounds such as benzene, napthalene, toluene, xylene, and anthracene, or from a five-membered or six-membered heterocyclic ring containing oxygen or nitrogen atoms such as, for example, furan, pyrrole, and pyridine. Biphenyl and triphenyl groups are also included within the definition of Ar. Ar is preferably phenyl.

Preferred alkoxy groups of W, Q and T are methoxy and ethoxy groups. Preferred fluoroalkoxy groups of W, Q and T are trifluoromethoxy, perfluoroethoxy and $-CH_2C_3F_7$. W, Q and T may also comprise other groups attached through hydrolyzable bonds such as carboxylates and oximes. Suitable compounds of formula IV comprise $F(CF_2)_nC_6H_4(OCH_3)_3$, $F(CF_2)_nC_6H_4(OCH_2CH_3)_3$, $F(CF_2)_nC_6H_4(OCH_2CF_3)_3$ and mixtures thereof wherein n=6, 8 or 10. Suitable compounds of formula VI comprise $F(CF_2)_nCH_2CH_2Si(OCH_3)_3$, $F(CF_2)_nCH_2CH_2Si(OCH_2CH_3)_3$, $F(CF_2)_nCH_2CH_2(OCH_2CF_3)_3$, $F(CF_2)_nCH_2CH_2Si(OCH_2C_2F_5)_3$, $F(CF_2)_nCH_2CH_2Si(OCH_2C_3F_7)$ and mixtures thereof wherein n=6, 8 or 10.

For the dioxolanes of formula V and VA, $R_f$ is preferably $CF_3$, $C_2F_5$ or $C_3F_7$. Preferably, $R^{11}=R^{12}=CF_3$. Suitable compounds of formula

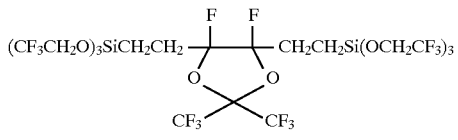

and

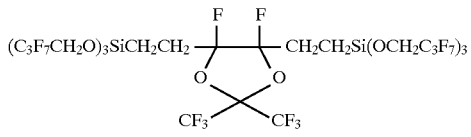

Synthesis of compounds of formula I can be afforded by alkoxylation of chlorosilanes or by alcohol exchange reactions. Compounds of formula I are thus prepared by contacting a molar excess of fluoroalcohol having the formula $R_fC_aH_{2a}OH$, wherein $R_f$ and a are defined as above, with $SiCl_4$, $Si(OR^1)_4$, $R^1SiCl_3$, $R^1Si(OR^1)_3$ or $R^1_2SiCl_2$ wherein $R^1$ is $C_1$ to about $C_8$ alkyl, to form the corresponding fluoroalkoxysilanes. Typically, the fluoroalcohol is added dropwise to the silicon halide or alcohol compound, with an optional acid or base catalyst for $Si(OR^1)_4$ or $R^1Si(OR^1)_3$ which is being stirred, over a period of time ranging from about 30 min to about 4 hrs. The reaction temperature is in the range of about −15° C. to about 10° C., preferably about 0° C. and is eventually raised to room temperature (25° C.). The fluoroalcohol reacts to replace all of the chlorine atoms of the silicon chloride, or 1, 2, 3 or all of the alkoxy groups of the silicon alkoxide compound with fluorinated alkoxy groups, with liberation of hydrogen chloride or alcohol. The fluoroalkoxysilane product can be recovered in purified state by removal of solvent and residual alcohol followed by distillation of the crude reaction product. Hydrogen chloride by-product is normally removed by purging the reaction mixture with dry inert gas, such as argon. Specific preparations of known formula I silanes comprise $(R_fCH_2O)_4Si$ ($R_f$=CF$_3$ to C$_{10}$F$_{21}$) in U.S. Pat. No. 2,993,925; (CF$_3$(CF$_2$)$_x$CX$_2$CH$_2$CH$_2$O)$_4$Si (x=0–4 and X=H or F) in U.S. Pat. No. 3,491,134; and HSi(OCH$_2$CF$_3$)$_3$ and CH$_2$=CHSi(OCH$_2$CF$_3$)$_3$ in U.S. Pat. No. 4,652,663 collectively incorporated by reference herein. In addition, the preparation of CH$_2$=CHSi(OCH$_2$CF$_3$)$_3$ is described in European Patent Application 0 232 024; and (C$_8$F$_{17}$CH$_2$CH$_2$)$_n$Si(OCH$_2$CH$_3$)$_{4-n}$ (n=1–3) in Japanese Kokai Application No. Sho 63-170806.

Mixtures comprising compounds of formula I, II, IIA, III, IIIA, IV, V, VA or VI and a compound such as an inorganic oxide precursor not normally soluble in or capable of gelation by itself in the fluorinated solvent, e.g., (R$_f$C$_a$H$_{2a}$O)$_t$SiR$_{4-t'}$, where R is alkoxy and t' is 0, 1 or 2, can be used in the present process as long as the mixtures are soluble in the fluorinated solvent. Such a mixture can be prepared, for example, from tetraethoxysilane and heptafluorobutanol to yield a mixture of formula I silanes, i.e., (C$_3$F$_7$CH$_2$O)$_t$Si(OCH$_2$CH$_3$)$_{4-t'}$, or from tetraethoxysilane and C$_8$F$_{17}$C$_6$H$_4$Si(OCH$_3$)$_3$ to yield a mixture of silanes from formula I and formula IV. This is generally not feasible in an aliphatic fluorinated solvent; however hexafluorobenzene can be an effective solvent.

Synthesis of the compounds of formula II and IIA are afforded from hydrosilylation reactions, i.e., an addition reaction between a compound containing a Si—H group with a compound containing aliphatic unsaturation, such as an alkene, in the presence of a catalyst or free radical initiator. Precursor segments containing —CH=CH$_2$ groups react with other precursor segments which contain terminal Si—H bonds.

Either precursor segment can contain the vinyl or other unsaturated group capable of Si—H addition. For example, Si(CH=CH$_2$)$_4$ reacts with HSi(OCH$_2$CF$_3$)$_3$ to form the precursor Si[CH$_2$CH$_2$Si(OCH$_2$CF$_3$)$_3$]$_4$; Si(CH=CH$_2$)$_4$ reacts with HSiCH$_3$(OCH$_2$CF$_3$)$_2$ to form the precursor Si(CH$_2$CH$_2$SiCH$_3$(OCH$_2$CF$_3$)$_2$)$_4$; and cyclo[(CH$_3$)HSiO]$_4$ reacts with CH$_2$=CH-Si(OCH$_2$C$_3$F$_7$)$_3$ to form the precursor cyclo[OSi(CH$_3$)CH$_2$CH$_2$Si(OCH$_2$C$_3$F$_7$)$_3$]$_4$.

All of the following equations provide for preparation of compounds of formula II by addition of a silane across a carbon-carbon double bond for various definitions of X: (Note that compounds of formula IIA can be prepared by substituting the group —SiR$^{10}$(OC$_a$H$_{2a}$R$_f$)$_2$ for all instances of —Si(OC$_a$H$_{2a}$R$_f$)$_3$.)

(a) when X is R$^1_m$SiY$_{4-m}$:

Eqn. 1A:
R$^1$mSi[(CR$^2$R$^3$)$_k$CR$^4$=CR$^6$R$^7$]$_{4-m}$+4-m H(CR$^8$R$^9$)$_h$Si(OC$_a$H$_{2a}$R$_f$)$_3$→R$^1_m$Si[CR$^2$R$^3$)$_k$CR$^4$R$^5$CR$^6$R$^7$(CR$^8$R$^9$)$_h$Si(OC$_a$H$_{2a}$R$_f$)$_3$]$_{4-m}$

Eqn. 1B:
R$^1$mSi[(CR$^2$R$^3$)$_k$H]4-m+4-m CR$^4$R$^5$=CR$^6$(CR$^8$R$^9$)$_h$Si(OC$_a$H$_{2a}$R$_f$)$_3$→R$^1_m$Si[(CR$^2$R$^3$)$_k$CR$^4$R$^5$CR$^6$H(CR$^8$R$^9$)$_h$Si(OC$_a$H$_{2a}$R$_f$)$_3$]$_{4-m}$ (b) when X is a ring structure of the type IIb(i), IIb(ii) or IIb(iii), as previously defined, which can be abbreviated (SiO)$_u$Z$_u$(YSi(OC$_a$H$_{2a}$R$_f$)$_3$)$_u$, wherein u=3 for IIb(i), u=4 for IIb(ii), and u=5 for IIb(iii); then Eqn. 2A:
(SiO)$_u$Z$_u$[(CR$^2$R$^3$)$_k$CR$^4$=CR$^6$R$^7$]$_u$+u H(CR$^9$R$^9$)$_h$Si(OC$_a$H$_{2a}$R$_f$)$_3$→(SiO)$_u$Z$_u$[(CR$^2$R$^3$)$_k$CR$^4$HCR$^6$R$^7$(CR$^8$R$^9$)$_h$Si(OC$_a$H$_{2a}$R$_f$)$_3$]$_u$ Eqn. 2B:
(SiO)$_u$Z$_u$[(CR$^2$R$^3$)$_k$H]$_u$+u CR$^4$R$^5$=CR$^6$(CR$^8$R$^9$)$_h$Si(OC$_a$H$_{2a}$R$_f$)$_3$→(SiO)$_u$Z$_u$[(CR$^2$R$^3$)$_k$CR$^4$R$^5$CR$^6$H(CR$^8$R$^9$)$_h$Si(OC$_a$H$_{2a}$R$_f$)$_3$]$_u$ (c) when X is R$^1_m$Si(OSi(CH$_3$)$_2$Y)$_{4-m}$ Eqn. 3A:
R$^1$mSi[OSi(CH$_3$)$_2$(CR$^2$R$^3$)$_k$CR$^4$=CR$^6$R$^7$]$_{4-m}$+4-m H(CR$^8$R$^9$)$_h$Si(OC$_a$H$_{2a}$R$_f$)$_3$→R$^1_m$Si[OSi(CH$_3$)$_2$(CR$^2$R$^3$)$_k$CR$^4$HCR$^6$R$^7$(CR$^8$R$^9$)$_h$Si(OC$_a$H$_{2a}$R$_f$)$_3$]$_{4-m}$ Eqn. 3B:
R$^1$mSi[OSi(CH$_3$)$_2$(CR$^2$R$^3$)$_k$H]$_{4-m}$+4-m CR$^4$R$^5$=CR$^6$(CR$^8$R$^9$)$_h$Si(OC$_a$H$_{2a}$R$_f$)$_3$→R$^1_m$Si[OSi(CH$_3$)$_2$(CR$^2$R$^3$)$_k$CR$^4$R$^5$CR$^6$H(CR$^8$R$^9$)$_h$Si(OC$_a$H$_{2a}$R$_f$)$_3$]$_{4-m}$ (d) when X is CH$_3$SiY$_2$OSiY$_2$CH$_3$:

Eqn. 4A:
CH$_3$Si((CR$^2$R$^3$)$_k$CR$^4$ = CR$^6$R$^7$)$_2$OSi((CR$^2$R$^3$)$_k$CR$^4$ = CR$^6$R$^7$)$_2$CH$_3$ + 4 H(CR$^8$R$^9$)$_h$Si(OC$_a$H$_{2a}$R$_f$)$_3$ →
CH$_3$Si((CR$^2$R$^3$)$_k$CR$^4$HCR$^6$R$^7$(CR$^8$R$^9$)$_h$Si(OC$_a$H$_{2a}$R$_f$)$_3$)$_2$OSi((CR$^2$R$^3$)$_k$CR$^4$HCR$^6$R$^7$(CR$^8$R$^9$)$_h$Si(OC$_a$H$_{2a}$R$_f$)$_3$)$_2$CH$_3$

Eqn. 4B:
CH$_3$Si((CR$^2$R$^3$)$_k$H)$_2$OSi((CR$^2$R$^3$)$_k$H)$_2$CH$_3$ + 4 CR$^4$R$^5$ = CR$^6$(CR$^8$R$^9$)$_h$Si(OC$_a$H$_{2a}$R$_f$)$_3$ →
CH$_3$Si((CR$^2$R$^3$)$_k$CR$^4$R$^5$CR$^6$H(CR$^8$R$^9$)$_h$Si(OC$_a$H$_{2a}$R$_f$)$_3$)$_2$OSi((CR$^2$R$^3$)$_k$CR$^4$R$^5$CR$^6$H(CR$^8$R$^9$)$_h$Si(OC$_a$H$_{2a}$R$_f$)$_3$)$_2$CH$_3$ (e) when X is Y$_3$SiOSiY$_3$ Eqn 5A:
Si((CR$^2$R$^3$)$_k$CR$^4$ = CR$^6$R$^7$)$_3$OSi((CR$^2$R$^3$)$_k$(CR$^4$ = CR$^6$R$^7$)$_3$ + 6 H(CR$^8$R$^9$)$_h$Si(OC$_a$H$_{2a}$R$_f$)$_3$ →
Si((CR$^2$R$^3$)$_k$CR$^4$HCR$^6$R$^7$(CR$^8$R$^9$)$_h$Si(OC$_a$H$_{2a}$R$_f$)$_3$)$_3$OSi((CR$^2$R$^3$)$_k$CR$^4$HCR$^6$R$^7$(CR$^8$R$^9$)$_h$Si(OC$_a$H$_{2a}$R$_f$)$_3$)$_3$ Eqn 5B:
Si((CR$^2$R$^3$)$_k$H)$_3$OSi((CR$^2$R$^3$)$_k$H)$_3$ + 6 CR$^4$R$^5$ = CR$^6$(CR$^8$R$^9$)$_h$Si(OC$_a$H$_{2a}$R$_f$)$_3$ →
Si((CR$^2$R$^3$)$_k$CR$^4$R$^5$CR$^6$H(CR$^8$R$^9$)$_h$Si(OC$_a$H$_{2a}$R$_f$)$_3$)$_3$OSi((CR$^2$R$^3$)$_k$CR$^4$R$^5$CR$^6$H(CR$^8$R$^9$)$_h$Si(OC$_a$H$_{2a}$R$_f$)$_3$)$_3$ (f) when X is $Y_2(CH_3)Si(CH_2)_bSi(CH_3)Y_2$

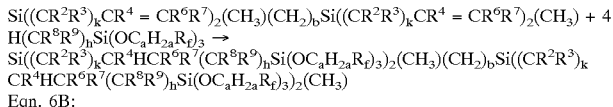

Eqn. 6A:

$Si((CR^2R^3)_kCR^4 = CR^6R^7)_2(CH_3)(CH_2)_bSi((CR^2R^3)_kCR^4 = CR^6R^7)_2(CH_3) + 4 H(CR^8R^9)_hSi(OC_aH_{2a}R_f)_3 \rightarrow Si((CR^2R^3)_kCR^4HCR^6R^7(CR^8R^9)_hSi(OC_aH_{2a}R_f)_3)_2(CH_3)(CH_2)_bSi((CR^2R^3)_k CR^4HCR^6R^7(CR^8R^9)_hSi(OC_aH_{2a}R_f)_3)_2(CH_3)$ Eqn. 6B:

$Si((CR^2R^3)_kH)_2(CH_3)(CH_2)_bSi((CR^2R^3)_kH)_2(CH_3) + 4 CR^4R^5 = CR^6(CR^8R^9)_hSi(OC_aH_{2a}R_f)_3 \rightarrow Si((CR^2R^3)_kCR^4R^5CR^6H(CR^8R^9)_hSi(OC_aH_{2a}R_f)_3)_2(CH_3)(CH_2)_bSi((CR^2R^3)_k CR^4R^5CR^6H(CR^8R^9)_hSi(OC_aH_{2a}R_f)_3)_3(CH_3)$ (g) when X is $Y_3Si(CH_2)_bSiY_3$:

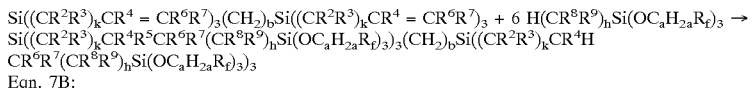

Eqn. 7A:

$Si((CR^2R^3)_kCR^4 = CR^6R^7)_3(CH_2)_bSi((CR^2R^3)_kCR^4 = CR^6R^7)_3 + 6 H(CR^8R^9)_hSi(OC_aH_{2a}R_f)_3 \rightarrow Si((CR^2R^3)_kCR^4R^5CR^6R^7(CR^8R^9)_hSi(OC_aH_{2a}R_f)_3)_3(CH_2)_bSi((CR^2R^3)_kCR^4H CR^6R^7(CR^8R^9)_hSi(OC_aH_{2a}R_f)_3)_3$ Eqn. 7B:

$Si((CR^2R^3)_kH)_3(CH_2)_bSi((CR^2R^3)_kH)_3 + 6 CR^4R^5 = CR^6(CR^8R^9)_hSi(OC_aH_{2a}R_f)_3 \rightarrow Si((CR^2R^3)_kCR^4R^5CR^6H(CR^8R^9)_hSi(OC_aH_{2a}R_f)_3)_3(CH_2)_bSi((CR^2R^3)_kCR^4R^5 CR^6H(CR^8R^9)_hSi(OC_aH_{2a}R_f)_3)_3$ (h) when X is $Y_3SiC_6H_4SiY_3$:

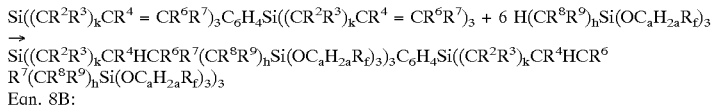

Eqn. 8A:

$Si((CR^2R^3)_kCR^4 = CR^6R^7)_3C_6H_4Si((CR^2R^3)_kCR^4 = CR^6R^7)_3 + 6 H(CR^8R^9)_hSi(OC_aH_{2a}R_f)_3$
$\rightarrow$
$Si((CR^2R^3)_kCR^4HCR^6R^7(CR^8R^9)_hSi(OC_aH_{2a}R_f)_3)_3C_6H_4Si((CR^2R^3)_kCR^4HCR^6 R^7(CR^8R^9)_hSi(OC_aH_{2a}R_f)_3)_3$ Eqn. 8B:

$Si((CR^2R^3)_kH)_3C_6H_4Si((CR^2R^3)_kH)_3 + 6 CR^4R^5 = CR^6(CR^8R^9)_hSi(OC_aH_{2a}R_f)_3 \rightarrow Si((CR^2R^3)_kCR^4R^5CR^6H(CR^8R^9)_hSi(OC_aH_{2a}R_f)_3)_3C_6H_4Si((CR^2R^3)_kCR^4R^5CR^6H(CR^8R^9)_h Si(OC_aH_{2a}R_f)_3)_3$ (i) when X is a substituted benzene structure of the type, as previously defined, which can be abbreviated $C_6H_{6-w}(SiZ_{3-c}Y_c)_w$, wherein w represents the number of substituents on the benzene ring:

Eqn. 9A:

$w\ x(OC_aH_{2a}R_f)_3Si(CR^8R^9)_hH + C_6H_{6-w}[SiZ_{3-c}((CR^2R^3)_kCR^4 = CR^6R^7)_c]_w \rightarrow C_6H_{6-w}[SiZ_{3-c}((CR^2R^3)_kCR^4HCR^6R^7(CR^8R^9)_hSi(OC_aH_{2a}R_f)_3)_c]_w$ Eqn. 9B:

$w\ x\ CR^4R^5 = CR^6(CR^8R^9)_hSi(OC_aH_{2a}R_f)_3 + C_6H_{6-w}[SiZ_{3-c}((CR^2R^3)_kH)_c]_w \rightarrow C_6H_{6-w}[SiZ_{3-c}((CR^2R^3)_kCR^4R^5CR^6H(CR^8R^9)_hSi(OC_aH_{2a}R_f)_3)_c]_w$ (j) when X is a substituted cyclohexane of the type, as previously defined, which can be abbreviated $C_6H_{12-w}Y_w$, wherein w is the number of substituents; then:

Eqn. 10A:

$C_6H_{12-w}((CR^2R^3)_kCR^4 = CR^6R^7)_w + w[(OC_aH_{2a}R_f)_3Si(CR^8R^9)_hH] \rightarrow C_6H_{12-w}((CR^2R^3)_kCR^4HCR^6R^7(CR^8R^9)_hSi(OC_aH_{2a}R_f)_3)_w$ For convenience the reaction of Equations denoted A or B above is chosen depending upon the commercial availability of the starting reagents. In each set of equations where an A and B are presented, h=0 in Eqn. A and k=0 in Eqn. B. Specific sources of reactants are listed hereinafter just prior to the Examples. A transition metal catalyst such as platinum, or a free radical initiatior is employed in an effective amount. Examples of suitable free radical initators include "VAZO" azo compounds available from E. I. du Pont de Nemours and Company, Wilmington, Del.

These reactions can be conducted at a temperature of from about 250° C. to about 100° C. Preferably the process is conducted at about 80° C. to about 100° C. The pressure employed is typically ambient, about 1 atm (1.01×10⁵ Pa). The reactions are carried out under an inert gas atmosphere, although use of an air atmosphere is not precluded. Reaction time is typically from about 4 hours to about 24 hours.

Use of solvent is not required in these reactions. Suitable solvents which may be employed are those capable of dissolving the reactants, such as toluene, and which do not interfere with the reaction or generate undesirable by-products. The desired product can be isolated by any means known to those skilled in the art. Preferably the desired product is isolated by removal of volatiles under reduced pressure.

NMR and mass spectrometry have been used to characterize product purities. Typically, yields of completed reacted material exceed 95%, with the principal impurities being either reverse (Markovnikov) hydrosilyation or incompletely substituted material containing unreacted —CH═CH₂ groups.

Synthesis of the compounds of formula III and IIIA is afforded by the following: (Note that the compounds of formula IIIA can be prepared by substituting the group —SiR$^{10}$(OR$^{13}$)$_2$ for all instances of —Si(OR$^{13}$)$_3$.)

Eqn. 11A:

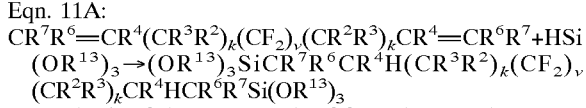

Synthesis of the compounds of formula III and IIIA can also be realized by insertion of unsaturated trifluoroalkoxysilanes or trihalosilanes into the C—I bond of I(CF$_2$)$_v$I, followed by reduction of the C—I to C-H using standard organic reduction reagents, as shown in Equation 11B. (P. Girard et al. in J. Am. Chem. Soc. (1980), Vol. 102, pp. 2693–2698 describe the use of SmI$_2$ in reduction reactions.) Examples of suitable reagents are zinc metal, tri-n-butyl tin hydride or samarium iodide.

Eqn. 11B:

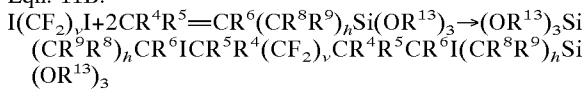

which can be converted to the following with, for example, samarium iodide (SmI$_2$),

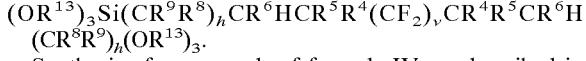

Synthesis of compounds of formula IV are described in U.S. Pat. 5,180,845 incorporated by reference herein and are afforded by organometallic reactions wherein the fluoroalkyl group and the silicon atom are attached to the dihalo aromatic in two sequential steps.

Synthesis of compounds of formula V and VA is readily afforded from direct hydrosilylation of a silicon hydride HSi(OR$^{13}$)$_3$, HSiR$^{10}$(OR$^{13}$)$_2$, HSiR$^{10}$Cl$_2$ or HSiCl$_3$ and a 4,5-divinyl-4,5-difluoro-1,3-dioxolane in the presence of a metal transition catalyst, such as Pt followed by alcoholysis if a chlorosilane is the product.

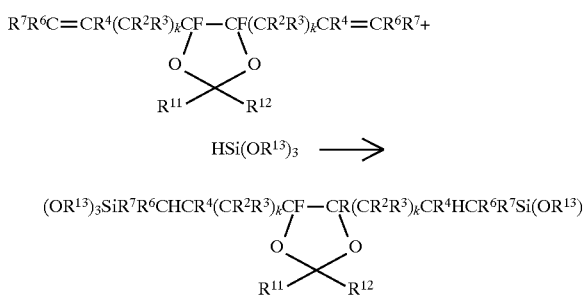

Synthesis of compounds of formula VI are prepared by methods known in the art for hydrocarbon silanes (see, Kirk-Othmer, Encyclopedia of Chemical Technology, third edition, vol. 20, and Mehrota, R. C., Pure Appl. Chem., 13, 111; 1966). The preferred method is by reacting the corresponding perfluoroalkyl trichlorosilane with the proper alcohol, such as methanol, ethanol, or 1,1,1-trifluoroethanol, for example, according to the following equation:

where o is 6–18.

The fluorinated trichlorosilane starting materials for the above reaction can be prepared by one of several recognized procedures; for example, see McBee, E. T., J. Am. Chem. Soc., 79, 2329 (1957); Adv. Organomet. Chem., 17, 407 (1970); U.S. Pat. No. 3,012,006; U.S. Pat. No. 4,089,882, or U.S. Pat. No. 4,549,003. In addition, F(CF$_2$)$_6$CH$_2$CH$_2$Si (OCH$_2$CH$_3$)$_3$ is commercially available from PCR Incorporated, P.O. Box 1466, Gainesville, Fla. 32602 (catalog #12303-4).

In the first step of the process of the present invention, the at least one inorganic oxide precursor is contacted with the fluorinated gelling agent in the presence of the fluorinated solvent. Either the gelling agent or the at least one inorganic oxide precursor can be first dissolved in a fluorinated solvent and the other reactant added to the resulting solution. Alternatively, both reactants can be separately dissolved in either the same or a different fluorinated solvent and the two solutions combined.

Temperature during contact and subsequent gelation can range from room temperature (25° C.) to about 100° C. Atmospheric pressure can be used. Preferably, the ratio of gelling agent to the inorganic oxide precursor can range from 2 to 8.

The resulting solution comprising the fluorinated solvent (s), the gelling agent and the at least one inorganic oxide precursor is allowed to stand for a time sufficient for gelation to occur. Gelation can also occur after coating with the solution. Gel time varies with the fluorinated solvent, amount of gelling agent, amount and type of inorganic oxide precursor(s), and temperature selected and in general can range from minutes to several days.

The inorganic gel of the present invention can be isolated via removal of liquid byproducts and unreacted starting materials, such as solvent, generally by evaporation to yield a monolithic glass, gel, film or coating. Drying can be at atmospheric pressure and at a temperature of from about 20° C. to about 225° C. Vacuum up to 10$^{-5}$ torr can also be employed.

The inorganic oxide gel produced by the process of the present invention is a network material that typically may have a small amount of unreacted fluoroalkoxy groups on the Al, B, Ge, Si, Sn, Ti or Zr atoms. Clear network wet gels made by the process of the present invention can display low dielectric constants and low refractive indexes. The process of the present invention can be used to prepare low energy surface coatings and primers for subsequent surface coatings. Wet gel can be dried to produce coatings, monoliths, and other shaped forms. By "dried" it is meant that the liquid residue of hydrolysis and condensation are removed, such as by evaporation at elevated temperatures.

Thus, the present invention further comprises a coated substrate wherein the coating is a multilayer coating comprising a primer, a topcoat, and optionally one or more intermediate coats between the primer and topcoat, wherein the topcoat is a fluoropolymer and the primer is a coating prepared by the process of the present invention.

Primer coatings made by the present process herein are useful for promoting the adhesion of fluoropolymer topcoats and can increase the durability of the topcoat. Preferred fluoropolymer topcoats are copolymers derived from tetrafluoroethylene (TFE), such as a copolymer from TFE and bis 2,2-(trifluoromethyl)-4,5-difluoro-1,3-dioxole; a copolymer from TFE and hexafluoropropylene; and a copolymer from TFE and a perfluoroalkylvinylether.

Coating a substrate for example, glass, ceramic, plastic, rubber, elastomer, wood, or metal, via dip, flow or spray coating methods can be provided by contacting the substrate with the solution comprising the inorganic oxide precursor (s), the fluorinated gelling agent, and the solvent(s) prior to gelation, with subsequent drying and optional heating up to about 350° C. The coating solution can be heated at a temperature ranging from about room temperature to about the boiling point of the solvent.

Dip coating from solutions comprising the at least one inorganic oxide precursor and the gelling agent in the fluorinated solvent(s) onto glass slides, followed by an optional fluoropolymer overcoat, can give optically transparent films. After curing at temperatures typically ranging from about 25° C. to about 320° C., these slides show low surface energies as measured by advancing hexadecane contact angles of greater than 50°.

Surface energy is measured herein via contact angle measurements using the sessile drop method, wherein the surface energy of a sample is related to the contact angle θ according to the equation $\cos \theta = -1 + 2(\gamma_l^d \gamma_s^d)^{1/2}/\gamma_l^d$, where the superscript d refers to the dispersive component of the liquid or solid free energies, $\gamma$, l=liquid, and s=solid. For a given fluid, the higher the contact angle, the lower the surface energy of the solid. (See S. Wu, *Polymer Interface and Adhesion*, Chapter 8, Marcel Dekker, Inc., New York, N.Y., 1982, and B. Sauer, J. of Adhesion Science, Vol. 6, p. 955 (1992)).

Adhesion can be measured using standard ASTM test method D3359. The method covers procedures for assessing the adhesion of coating films to metallic substrates by applying and removing pressure-sensitive tape over cuts made in the film.

EXAMPLES

Inorganic oxide precursors were prepared by the reactions described above. All of these reactions were carried out in a Vacuum Atmospheres Co. dry box or under nitrogen. In the examples that follow, all commercial reagents were distilled prior to use. Tetrachlorosilane, trichlorosilane, vinyltrichlorosilane, trifluoroacetic acid, tetrakis (dimethylsiloxy)silane, and $F(CF_2)_6CH_2CH_2Si(OCH_2CH_3)_3$ were purchased from Aldrich Chemical Co., Milwaukee, Wis., United Techologies Inc., Bristol, Pa. or PCR Inc., Gainesille, Fla. $Si(OCH_2CF_3)_4$, $Si(OCH_2(CF_2)CF_3)_4$, $HSi(OCH_2CF_3)_3$, $C_8F_{17}C_6H_4Si(OCH_3)_3$ and $CH_2=CHSi(OCH_2CF_3)_3$ were synthesized by slight modifications of published procedures. Platinum divinylsiloxane complex (3–3.5% Pt concentration in xylene, Huls PC072) was obtained from Huls America Inc. and diluted 5:1; by volume (toluene, Pt complex) prior to use. Tetrahydrofuran was reagent grade and purified by distillation from calcium hydride prior to use. Vinylpolyfluoroalkanes were prepared from $I(CF_2)_6I$ available from PCR Inc., 2,2-bis (trifluoromethyl)-4,5-difluoro-4,5-divinyl-1,3-dioxolane and all "TEFLON" AF fluoropolymers were obtained pure from E. I. du Pont de Nemours and Company, Wilmington, Del. Perfluorophenanthrene "FLUTEC" PP-11 and "FLUORINERT" FC-75 solvent were obtained from PCR, Inc., Gainesville, Fla. Hexafluorobenzene was obtained from Aldrich Chemical, Inc.

The following are abbreviations used in the description and the Examples:
FBS=tetra(heptafluorobutoxy)silane, $Si(OCH_2C_3F_7)_4$
FBS-PDD=2,2-bis(trifluoromethyl)-4,5-difluoro-4,5 bis(tris (1H,1H-heptafluorobutoxy)silylethyl)-1,3-dioxolane
FBS-Star 16=$(C_3F_7CH_2O)_3SiCH_2CH_2(CF_2)_6CH_2CH_2Si(OCH_2C_3F_7)_3$
FC-75=perfluoro(butyl THF)
FES=tetra(trifluoroethoxy)silane, $Si(OCH_2CF_3)_4$
FOES=$F(CF_2)_6CH_2CH_2Si(OCH_2CH_3)_3$
F-Star 3=$Si[OSi(CH_3)_2CH_2CH_2Si(OCH_2C_3F_7)_3]_4$
HFB=hexafluorobenzene
HFBS=tri(heptafluorobutoxy)silane, $HSi(OCH_2C_3F_7)_3$
Me=methyl
PDD=2,2-bis(trifluoromethyl)-4,5-difluoro-1,3-dioxole
PFP=pentafluoropropionic acid
PP-11=perfluoro phenanthrene
tape=Scotch 898 brand
TEOS=$Si(OCH_2CH_3)_4$, tetraethoxysilane
TFA=trifluoroacetic acid, $CF_3COOH$
THF=tetrahydrofuran

Example 1

F-Star 3 in FC-75

264 mg $Si[OSi(CH_3)_2CH_2CH_2Si(OCH_2C_3F_7)_3]_4$ (F-Star 3) was dissolved in 899 mg perfluoro(butyltetrahydrofuran) (FC-75) to give a clear solution. 80 mg trifluoroacetic acid (TFA) was added (molar ratio of acid to silane-7.0). The solution was still clear and fluid after 22 hrs at room temperature. The material was placed in an oven at 75° C. A clear gel formed some time between 3.1 and 17.4 hrs (gelation not directly observed).

Example 2

F-Star 3 in PP-11

227 mg of F-Star 3 was added to 830 mg perfluorophenanthrene (PP-11) in a 25 ml flask. A clear solution resulted. 85 mg of TFA was added. The TFA took about a minute to mix in, but then gave a clear solution. The flask was placed into a 75° C. oven. After 20 and ¼ hours a soft clear gel had formed.

Example 3

FBS in PP-11

7.00 g of $Si(OCH_2C_3F_7)_4$ (FBS) was dissolved in 20.0 g PP-11. Then 5.72 g pentafluoropropionic acid (PFP) was added (molar ratio of acid to silane-4.1). The solution was heated to 92° C. for 5 days. The FBS had formed a hazy gel in the time interval between 2 and 5 days. The liquid was then removed from the gel in a vacuum oven at 90° C. to give a dry solid. The solid was analyzed for surface area and pore volume by the nitrogen BET method. (The nitrogen BET method is described by S. Brunauer et al., in J. Am. Chem. Soc., 60 (1938) 309 and can be used to calculate specific area of gel tested by adsorption analyses.) The surface area was determined to be 777 m2/g and the pore volume was 1.52 cc/g. The latter is unusually high for a silica gel [cf. Hench, U.S. Pat. No. 4,849,378, with pore volumes ranging from 0.23 to 1.49 for a variety of samples].

Example 4

Gel from tetraethoxysilane (TEOS) and p-n-$C_8F_{17}C_6H_4Si(OCH_3)_3$ in hexafluorobenzene (HFB)

0.50 g each of TEOS and p-n-$C_8F_{17}C_6H_4Si(OCH_3)_3$ were dissolved in 1.49 g hexafluorobenzene to give a clear solution. 1.49 g TFA was added (molar ratio acid/silane= 4.98). The solution remained clear. After standing at room temperature for 4.5 hrs, the solution gelled. The liquid present was removed on a vacuum line at 18 torr pressure, then the dry solid was pulverized and examined by solid state silicon NMR. The NMR revealed that both of the silanes were incorporated into the solid at comparable efficiencies.

Example 5

Gel from tetra(trifluoroethoxy)silane (FES) in HFB 232 mg FES and 244 mg TFA (molar ratio acid/silane= 3.91) were dissolved in 514 mg HFB. The resultant clear solution was allowed to stand at room temperature until it gelled (at between 14 and 19 days). The gel was clear.

Example 6

Adhesion promotion of "TEFLON" AF 1600 to glass using FBS-PDD/HFBS primer in FC-75

A solution consisting of 1:1 molar 2,2-bis(trifluoromethyl)-4,5-difluoro-4,5 bis(tris(1H,1H-heptafluorobutoxy)silylethyl)-1,3-dioxolane/HSi(OCH$_2$C$_3$F$_7$)$_3$ (FBS-PDD/HFBS) (0.017 g) in 13.51 g of FC-75 was prepared. TFA (3.7 mg) was added while stirring, and the solution was allowed to sit for 1 hr. This solution was used to dip coat glass microscope slides at a withdrawal rate of 14.6 mm/min. After the first coat, all slides were dried at 150° C. for 30 min. A fluoropolymer coat was applied dip coating from a 0.5% "TEFLON" AF 1600 solution in FC-75. ("TEFLON" AF is a copolymer of tetrafluoroethylene and bis-2,2-(trifluoromethyl)4,5-difluoro-1,3-dioxole). The slides were then heated to 150° C. for 30 min followed by 225° C. for 30 min. After cooling, the samples were analyzed by contact angle measurements. The advancing hexadecane contact angle was 62°. The samples were then subjected to boiling water for 30 min, and the contact angle remeasured after drying. The advancing angle for hexadecane was 57°. The samples were subjected to an adhesive tape test (not cross hatched). The coating was unaffected by the tape pull.

Example 7

Adhesion promotion of "TEFLON" AF 1600 to glass using FOES Primer in FC-75

F(CF$_2$)$_6$CH$_2$CH$_2$Si(OCH$_2$CH$_3$)$_4$ (FOES) (19.8 mg; 0.032 mmol) and 16.9 mg (0.148 mmol) of TFA was dissolved in 13.50 g of FC-75. The solution was allowed to sit for 1 hr. Some solids were filtered off before dip coating. Glass microscope slides were dip coated using this solution as described in Example 6. After the primer coat, all slides were dried at 150° C. for 30 min. A fluoropolymer top coat was applied dip coating from a 0.5% "TEFLON" AF 1600 solution in FC-75. The slides were then heated to 150° C. for 30 min followed by 225° C. for 30 min. The slides were analyzed by contact angle measurements. The advancing contact angle for hexadecane was 66°. After boiling for 30 min, the sample showed an advancing angle was 60°. The coating was unaffected by the tape pull.

Comparative Example 8

Lack of Adhesion Promotion of "TEFLON" AF 1600 to glass using FOES primer in water/ethanol solvent FOES (2.0 ml) was reacted with 0.5 ml of water in 9.5 ml of ethanol. The solution was allowed to sit for about 1 hr. Glass microscope slides were dip coated using this solution as described in the previous examples. After the primer coat, all slides were dried at 150° C. for 30 min. A fluoropolymer top coat was applied dip coating from a 0.5% "TEFLON" AF 1600 solution in FC-75. The slides were then heated to 150° C. for 30 min followed by 225° C. for 30 min. After cooling, the samples were analyzed by contact angle measurements. The advancing contact angle for hexadecane was 61°. After boiling for 30 min, the advancing angle was 51°. The coating was easily removed by tape pull.

Example 9

Control A: Extrusion of abrasive polyethylene through stainless steel capillary die A stainless steel capillary die of size 0.05 cm×2.5 cm×1800 was cleaned by heating to red heat with a propane torch. After cooling to room temperature, a linear low density polyethylene with a melt index of 1 g/10 min, containing 2.5 wt % of a silica filler, was extruded through the die using an Instron® Capillary Rheometer. The shear stress required to extrude the polyethylene at 220° C. at a shear rate of 704 s$^{-1}$ was 0.50 MPa. The extrusion was performed at a constant shear rate of 704 s$^{-1}$ for a period of two hours. During this period, the shear stress remained constant at 0.50 MPa. The surface of the extrudate was rough and distorted throughout the test.

Control B: Extrusion of abrasive polyethylene through stainless steel capillary die that has been coated with "TEFLON" AF from solution The stainless steel capillary die of Control A was cleaned by heating to red heat with a propane torch. After cooling to room temperature, the inside surface of the capillary was coated with a 3% solution of "TEFLON" AF 1601 dissolved in "FLUORINET" FC-75. The coating was dried for 2 hours at 250° C. The linear low density polyethylene of Control A, which contained 2.5 wt % of a silica filler, was extruded through the coated capillary for a period of two hours at 220° C. and at a constant shear rate of 704 s$^{-1}$. The shear stress required to extrude the polyethylene through the coated die was 0.30 MPa at the start of the extrusion. The shear stress remained constant for a period of about 10 minutes and then increased to 0.50 MPa after a total of about 20 minutes. The shear stress then remained constant at 0.50 MPa for the duration of the test. The surface of the extrudate was smooth at the start of the extrusion but became rough after about 20 minutes.

This Example shows that a coating of "TEFLON" AF on an extrusion die acts as a processing aid for the extrusion of linear low density polyethylene. The "TEFLON" coating allows the polyethylene to be extruded at a lower exrusion pressure (lower shear stress) and results in an extrudate with better surface appearance. However, the "TEFLON" coating is removed from the surface of the die by abrasion during the extrusion process.

Extrusion of abrasive polyethylene through stainless steel capillary die coated with a primer and top coat of "TTEFLON" AF The stainless steel capillary die of Control B was cleaned by heating to red heat with a propane torch. After cooling to room temperature, the inside surface of the capillary was coated with a solution of FBS-Star 16 fluorosilane. This primer coating was then top coated with a 3% solution of "TEFLON" AF 1601 dissolved in "FLUORINET" FC-75. The top coat was dried for 2 hours at 250° C. The linear low density polyethylene of Control A, which contained 2.5 wt % of a silica filler, was extruded through the coated capillary for a period of two hours at 220° C. and at a constant shear rate of 704 s$^{-1}$. The shear stress required to extrude the polyethylene was 0.30 MPa at the start of the extrusion. The shear stress remained constant for a period of about 40 minutes and then slowly increased to 0.50 MPa after a total of about 1 hour. The surface of the extrudate was smooth for about 1 hour.

This Example shows that the coating of a primer, consisting of an inorganic oxide gel, followed by a top coat of a "TEFLON" AF 1601 copolymer onto an extrusion die improves the performance and the durability of the top coat as a processing aid.

What is claimed is:

1. A process for the preparation of an inorganic oxide gel, comprising the steps of:

(a) contacting at least one fluorinated inorganic oxide precursor or a mixture comprising a fluorinated inorganic oxide precursor and an inorganic oxide precursor, such inorganic oxide precursor not soluble alone in a fluorinated solvent, with a fluorinated gelling agent in the presence of at least one fluorinated solvent to form a solution;

(b) gelling the solution for a time sufficient to form an isolatable inorganic oxide gel; and (c) isolating the inorganic oxide gel.

2. The process of claim 1 wherein the at least one fluorinated solvent is selected from the group consisting of: perfluoro(butyl THF), a mixture of perfluorotrialkylamines, $C_3F_7OCHFCF_3$, hexafluorobenzene, perfluorophenanthrene, perfluoromethylcyclohexane, and perfluoro(n-ethylmorpholine).

3. The process of claim 1 wherein the gelling agent is selected from the group consisting of: trifluoroacetic acid, perfluoropropionic acid, and trifluoromethanesulfonic acid.

4. The process of claim 1 wherein the fluorinated inorganic oxide precursor is a fluoroalkoxide of Al, B, Ge, Si, Sn, Ti and Zr.

5. The process claim 4 wherein the fluorinated inorganic oxide precursor is a compound having the formula $(R_fC_aH_{2a}O)_nMR_{4-n}$, wherein:

M is Ge, Si or Sn;

a is an integer from 1 to about 10;

n is 2, 3 or 4;

$R_f$ has up to about of 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$; and R is selected from the group consisting of:
H, $C_1$ to about $C_8$ alkyl, $C_aH_{2a}R_f$, $C_1$ to about $C_8$ alkoxy, $C_1$ to about $C_{10}$ carboxy, $C_1$ to about $C_{10}$ fluorocarboxy, $C_2$ to about $C_8$ alkenyl, $C_2$ to about $C_8$ alkynyl, $C_6H_5$, aryl, and aralkyl.

6. The process of claim 4 wherein the fluorinated inorganic oxide precursor is a compound having the formula $(R_fC_aH_{2a}O)_nM'R_{4-n}(HOR)_q$, wherein:

M' is Ti or Zr;

n is 2, 3 or 4;

$R_f$ has up to about of 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$; and R is selected from the group consisting of:
H, $C_1$ to about $C_8$ alkyl, $C_aH_{2a}R_f$, $C_1$ to about $C_8$ alkoxy, $C_1$ to about $C_{10}$ carboxy, $C_1$ to about $C_{10}$ fluorocarboxy, $C_2$ to about $C_8$ alkenyl, $C_2$ to about $C_8$ alkynyl, $C_6H_5$, aryl, and aralkyl;

a is an integer from 1 to about 10; and q is 0 or 1.

7. The process of claim 4 wherein the fluorinated inorganic oxide precursor is a compound having the formula $(R_fC_aH_{2a}O)_{n'}M''R_{3-n'}$, wherein:

M'' is Al or B;

n' is 1, 2 or 3;

$R_f$ has up to about of 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2O)_q-CF_3$, wherein q is an integer of at least 2; and
(d) $-CH_2-C(CF_3)_2-CF_2-CF_2-CF_3$; and R is selected from the group consisting of:
H, $C_1$ to about $C_8$ alkyl, $C_aH_{2a}R_f$, $C_1$ to about $C_8$ alkoxy, $C_1$ to about $C_{10}$ carboxy, $C_1$ to about $C_{10}$ fluorocarboxy, $C_2$ to about $C_8$ alkenyl, $C_2$ to about $C_8$ alkynyl, $C_6H_5$, aryl, and aralkyl; and a is an integer from 1 to about 10.

8. The process of claim 4 wherein the fluorinated inorganic oxide precursor is a chelating compound having the formula $(R_fC_aH_{2a}O)_{n''}M'''^{cn}D^d p$ wherein:

D is a chelating ligand, optionally fluorinated;

M''' is Al, Ti or Zr;

cn is an aluminum, titanium or zirconium coordination number, being in each case an integer having a value of 4–6;

d is a number, either 2 or 3, corresponding to the chelating ability of the ligand D, d being 2 for a bidentate ligand and 3 for a tridentate ligand;

p is either 1, 2 or 3, except that for d=3, p always is 1;

n'' is cn−(d×p);

$R_f$ has up to about of 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$; and a is an integer from 1 to about 10.

9. The process of claim 1 wherein the inorganic oxide precursor is a fluorine-bearing silane.

10. The process of claim 9 wherein the fluorinated inorganic oxide precursor is a compound selected from the group consisting of:

a compound having the formula:

$(R_fC_aH_{2a}O)_tSiR_{4-t}$ (I)

wherein:

$R_f$ has up to about 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;

each $R_f$ optionally substituted with one or more hydrogen;

R is selected from the group consisting of: hydrogen, $C_1$ to about $C_8$ alkyl, $C_aH_{2a}R_f$, $C_1$ to about $C_8$ alkoxy, $C_1$ to about $C_{10}$ carboxy, $C_1$ to about $C_{10}$ fluorocarboxy, $C_2$ to about $C_8$ alkenyl, $C_2$ to about $C_8$ alkynyl, $C_6H_5$, aryl, and aralkyl;

t is 1, 2, 3 or 4; and a is an integer from 1 to about 10;

a compound having the formula:

$X(Si(OC_aH_{2a}R_f)_3)_n$  (II)

wherein:
X is at least one organic link selected from the group consisting of:
(a) $R^1_m SiY_{4-m}$;
(b) ring structures

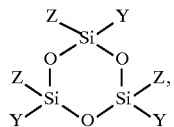   IIb(i)

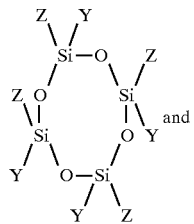 and   IIb(ii)

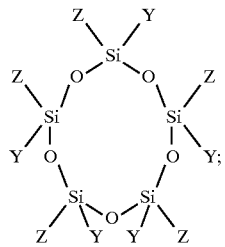;   IIb(iii)

(c) $R^1_m Si(OSi(CH_3)_2Y)_{4-m}$;
(d) $CH_3SiY_2OSiY_2CH_3$;
(e) $Y_3SiOSiY_3$;
(f) $Y_2(CH_3)Si(CH_2)_b Si(CH_3)Y_2$;
(g) $Y_3Si(CH_2)_b SiY_3$;
(h) $Y_3SiC_6H_4SiY_3$;
(i) substituted benzene, including all isomers, selected from the group consisting of:
 (i) $C_6H_3(SiZ_{3-c}Y_c)_3$;
 (ii) $C_6H_2(SiZ_{3-c}Y_c)_4$;
 (iii) $C_6H(SiZ_{3-c}Y_c)_5$; and
 (iv) $C_6(SiZ_{3-c}Y_c)_6$; and
(j) substituted cyclohexane, including all stereoisomers, selected from the group consisting of:
 (i) $1,2\text{-}C_6H_{10}(Y)_2$; $1,3\text{-}C_6H_{10}(Y)_2$; $1,4\text{-}C_6H_{10}(Y)_2$;
 (ii) $1,2,4\text{-}C_6H_9(Y)_3$; $1,2,3\text{-}C_6H_9(Y)_3$; $1,3,5\text{-}C_6H_9(Y)_3$;
 (iii) $1,2,3,4\text{-}C_6H_8(Y)_4$; $1,2,4,5\text{-}C_6H_8(Y)_4$; $1,2,3,5\text{-}C_6H_8(Y)_4$;
 (iv) $1,2,3,4,5\text{-}C_6H_7(Y)_5$; and
 (v) $C_6H_6(Y)_6$;

$R_f$ has up to about 18 carbon atoms and is selected from the group consisting of:
(a) $C_1$ to about $C_{18}$ perfluoroalkyl;
(b) $-[CF_2CF(CF_3)O]_r-CF_2-CF_2-CF_3$, wherein r is an integer of at least 1;
(c) $-CF_2-(CF_2-O)_q-CF_3$, wherein q is an integer of at least 2; and
(d) $-CH_2-C(CF_3)_2-CF_2-CF_2-CF_3$;
each $R_f$ optionally substituted with one or more hydrogen;
Z is $C_1$ to about $C_4$ alkyl, 3,3,3-trifluoropropyl, aralkyl or aryl;

Y is $-(CR^2R^3)_k CR^4R^5CR^6R^7(CR^8R^9)_h-$
$R^1$ is $C_1$ to about $C_8$ alkyl or aryl;
$R^2$ to $R^6$ are each independently hydrogen, $C_1$ to about $C_8$ alkyl or aryl, provided that at least one of $R^4$ to $R^7$ is hydrogen;
m is 0, 1 or 2;
k and h are each independently an integer from 0 to 10, provided that at least one of k or h is zero;
a is an integer from 1 to about 10;
b is an integer from 1 to about 10;
c is 1, 2 or 3; and
n is an integer greater than or equal to 2;
a compound having the formula:

$X(R^{10}Si(OC_aH_{2a}R_f)_2)_n$  (IIA)

wherein:
X is at least one organic link selected from the group consisting of:
(a) $R^1_m SiY_{4-m}$;
(b) ring structures

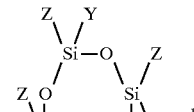   IIAb(i)

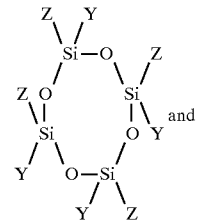 and   IIAb(ii)

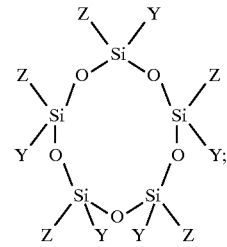;   IIAb(iii)

(c) $R^1_m Si(OSi(CH_3)_2Y)_{4-m}$;
(d) $CH_3SiY_2OSiY_2CH_3$;
(e) $Y_3SiOSiY_3$;
(f) $Y_2(CH_3)Si(CH_2)_b Si(CH_3)Y_2$;
(g) $Y_3Si(CH_2)_b SiY_3$;
(h) $Y_3SiC_6H_4SiY_3$;
(i) substituted benzene, including all isomers, selected from the group consisting of:
 (i) $C_6H_3(SiZ_{3-c}Y_c)_3$;
 (ii) $C_6H_2(SiZ_{3-c}Y_c)_4$;
 (iii) $C_6H(SiZ_{3-c}Y_c)_5$; and
 (iv) $C_6(SiZ_{3-c}Y_c)_6$; and
(j) substituted cyclohexane, including all stereoisomers, selected from the group consisting of:
 (i) $1,2\text{-}C_6H_{10}(Y)_2$; $1,3\text{-}C_6H_{10}(Y)_2$; $1,4\text{-}C_6H_{10}(Y)_2$;
 (ii) $1,2,4\text{-}C_6H_9(Y)_3$; $1,2,3\text{-}C_6H_9(Y)_3$; $1,3,5\text{-}C_6H_9(Y)_3$;
 (iii) $1,2,3,4\text{-}C_6H_8(Y)_4$; $1,2,4,5\text{-}C_6H_8(Y)_4$; $1,2,3,5\text{-}C_6H_8(Y)_4$;

(iv) 1,2,3,4,5-$C_6H_7(Y)_5$; and
(v) $C_6H_6(Y)_6$;

$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

Z is $C_1$ to about $C_4$ alkyl, 3,3,3-trifluoropropyl, aralkyl or aryl;

Y is —$(CR^2R^3)_k CR^4R^5CR^6R^7(CR^8R^9)_h$—

$R^1$ is $C_1$ to about $C_8$ alkyl or aryl;

$R^2$ to $R^9$ are each independently hydrogen, $C_1$ to about $C_8$ alkyl or aryl, provided that at least one of $R^4$ to $R^7$ is hydrogen;

$R^{10}$ is $C_1$ to about $C_8$ alkyl or $C_aH_{2a}R_f$;

m is 0, 1 or 2;

k and h are each independently an integer from 0 to 10, provided that at least one of k or h is zero;

a is an integer from 1 to about 10;

b is an integer from 1 to about 10;

c is 1, 2 or 3; and n is an integer greater than or equal to 2;

a compound having the formula:

$(CF_2)_v[YSi(OR^{13})_3]_2$ (III)

wherein:

$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;

$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

a is an integer from 1 to about 10;

v is an even integer from 2 to about 14;

Y is —$(CR^2R^3)_k CR^4R^5CR^6R^7(CR^8R^9)_h$—

$R^2$ to $R^9$ are each independently hydrogen, $C_1$ to about $C_8$ alkyl or aryl, provided that at least one of $R^4$ to $R^7$ is hydrogen; and k and h are each independently an integer from 0 to 10, provided that at least one of k or h is zero;

a compound having the formula:

$(CF_2)_v[YSiR^{10}(OR^{13})_2]_2$ (IIIA)

wherein:

$R^{10}$ is $C_1$ to about $C_8$ alkyl or $C_aH_{2a}R_f$;

$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

a is an integer from 1 to about 10;

v is an even integer from 2 to about 14;

Y is —$(CR^2R^3)_k CR^4R^5CR^6R^7(CR^8R^9)_h$—

$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;

$R^2$ to $R^9$ are each independently hydrogen, $C_1$ to about $C_8$ alkyl or aryl, provided that at least one of $R^4$ to $R^7$ is hydrogen; and k and h are each independently an integer from 0 to 10, provided that at least one of k or h is zero;

a fluoroalkylphenylsilane having the formula:

wherein:

$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

Ar is a divalent aromatic radical;

W is selected from the group consisting of
(e) $C_1$ to about $C_8$ alkyl;
(f) $R_f$—Ar, wherein each of $R_f$ and Ar is as defined above;
(g) halogen selected from the group consisting of chlorine, bromine and iodine;
(h) $C_1$ to about $C_8$ alkoxy;
(i) $C_1$ to about $C_8$ fluoroalkoxy; and
(j) $C_1$ to about $C_{10}$ carboxy or fluorocarboxy; and each of Q and T independently is selected from the group consisting of
(k) halogen selected from the group consisting of chlorine, bromine and iodine;
(l) $C_1$ to about $C_8$ alkoxy;
(m) $C_1$ to about $C_8$ fluoroalkoxy; and
(n) $C_1$ to about $C_{10}$ carboxy or fluorocarboxy;

a dioxolane having the formula:

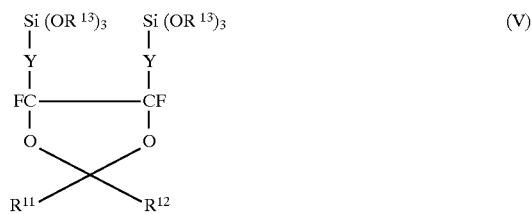

wherein:

$R^{13}$ is $C_1$ to about $C_8$ alkyl, $C_1$ to about $C_{10}$ carboxy, $C_1$ to about C fluorocarboxy, halogen or $C_aH_{2a}R_f$;

$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;

each $R_f$ optionally substituted with one or more hydrogen;

a is an integer from 1 to about 10;
Y is —$(CR^2R^3)_k CR^4R^5CR^6R^7(CR^8R^9)_h$—
$R^2$ to $R^9$ are each independently hydrogen, $C_1$ to about $C_8$ alkyl or aryl, provided that at least one of $R^4$ to $R^7$ is hydrogen;
k and h are each independently an integer from 0 to 10, provided that at least one of k or h is zero; and
$R^{11}$ and $R^{12}$ are each independently selected from $C_1$ to $C_3$ fluoroalkyl or fluorine;

a dioxolane having the formula:

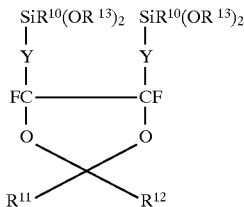

(VA)

wherein:
$R^{10}$ is $C_1$ to about $C_8$ alkyl or $C_aH_{2a}R_f$;
$R_f$ has up to about 18 carbon atoms and is selected from the group consisting of:
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;
each $R_f$ optionally substituted with one or more hydrogen;
a is an integer from 1 to about 10;
Y is —$(CR^2R^3)_k CR^4R^5CR^6R^7(CR^8R^9)_h$—
$R^{13}$ is $C_1$ to about $C_8$ alkyl, $C_1$ to about $C_{10}$ carboxy, $C_1$ to about $C_{10}$ fluorocarboxy, halogen or $C_aH_{2a}R_f$;
$R^2$ to $R^9$ are each independently hydrogen, $C_1$ to about $C_8$ alkyl or aryl, provided that at least one of $R^4$ to $R^7$ is hydrogen;
k and h are each independently an integer from 0 to 10, provided that at least one of k or h is zero; and
$R^{11}$ and $R^{12}$ are each independently selected from $C_1$ to $C_3$ fluoroalkyl or fluorine; and a compound having the formula:

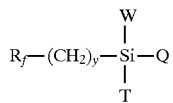

(VI)

wherein:
y is an integer from 2 to about 10;
$R_f$ has up to about 18 carbon atoms and is selected from the group consisting of
(a) $C_1$ to about $C_{18}$ perfluoroalkyl;
(b) —$[CF_2CF(CF_3)O]_r$—$CF_2$—$CF_2$—$CF_3$, wherein r is an integer of at least 1;
(c) —$CF_2$—$(CF_2$—$O)_q$—$CF_3$, wherein q is an integer of at least 2; and
(d) —$CH_2$—$C(CF_3)_2$—$CF_2$—$CF_2$—$CF_3$;
each $R_f$ optionally substituted with one or more hydrogen;
Ar is a divalent aromatic radical;
W is selected from the group consisting of
(e) $C_1$ to about $C_8$ alkyl;
(f) $R_f$—Ar, wherein each of $R_f$ and Ar is as defined above;
(g) halogen selected from the group consisting of chlorine, bromine and iodine;

(h) $C_1$ to about $C_8$ alkoxy; and
(i) $C_1$ to about $C_8$ fluoroalkoxy;
(j) $C_1$ to about $C_{10}$ carboxy or fluorocarboxy; and
each of Q and T independently is selected from the group consisting of
(k) halogen selected from the group consisting of chlorine, bromine and iodine;
(l) $C_1$ to about $C_8$ alkoxy;
(m) $C_1$ to about $C_8$ fluoroalkoxy; and
(n) $C_1$ to about $C_{10}$ carboxy or fluorocarboxy.

11. The process of claim 10 wherein the fluorinated inorganic oxide precursor is selected from the group consisting of: Si $(OCH_2CF_3)_4$; Si$(OCH_2C_3F_7)_4$; HSi $(OCH_2C_3F_7)_3$; F$(CF_2)_6CH_2CH_2Si(OCH_2CH_3)_3$; F$(CF_2)_6CH_2CH_2Si(OCH_3)_3$; $(CH_3O)_3Si(OCH_2CH_2C_6F_{13})$; $(CH_3O)_2Si(OCH_2CH_2C_6F_{13})_2$; Si$(OCH_2CH_2C_6F_{13})_4$; HSi $(OCH_2CF_3)_3$; $(CH_3O)_3Si(OCH_2CF_3)$; $(CH_3O)_3Si (OCH_2C_3F_7)$; $(CH_3O)_2Si(OCH_2CF_3)_2$; $(CH_3O)_2Si (OCH_2C_3F_7)_2$; $CH_2$=$CHSi(OCH_2CF_3)_3$; Si$(OSi(CH_3)_2CH_2CH_2Si(OCH_2CF_3)_3)_4$; Si$(OSi(CH_3)_2CH_2CH_2Si (OCH_2C_3F_7)_3)_4$; Si$(CH_2CH_2Si(OCH_2CF_3)_3)_4$; Si$(CH_2CH_2Si(OCH_2C_3F_7)_3)_4$; $(CH_3(CF_3CH_2O)_3SiCH_2CH_2)SiO)_4$; $(CH_3((C_3F_7CH_2O)_3SiCH_2CH_2)SiO)_4$; $(C_3F_7CH_2O)_3Si(CH_2)_2(CF_2)_6(CH_2)_2Si(OCH_2C_3F_7)_3$; $(CF_2)_6[(CH_2)_2Si(OEt)_3]_2$; $C_8F_{17}C_6H_4(OCH_3)_3$; $C_8F_{17}CH_2CH_2Si (OCH_3)_3$; $C_8F_{17}C_6H_4(OCH_2CF_3)_3$; $C_8F_{17}CH_2CH_2Si (OCH_2CF_3)_3$;

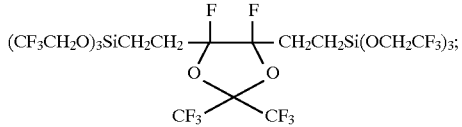

and

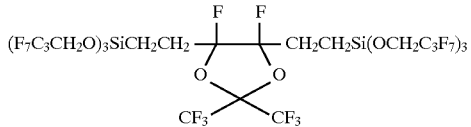

12. The process of claim 10 wherein the fluorinated inorganic oxide precursor is selected from the group consisting of a compound having the formula $(R_fC_aH_{2a}O)_tSiR_{4-t}$ and $(CF_2)_v[YSi(OR^{13})_3]_2$, wherein $R^{13}$ is $C_aH_{2a}R_f$.

13. A coated substrate wherein the coating is a multilayer coating comprising: a primer, a topcoat, and optionally one or more intermediate coats between the primer and the topcoat, wherein the topcoat is a fluoropolymer and the primer is a coating comprising a dried inorganic oxide gel, said inorganic oxide gel prepared by the process of claims 1, 9, 10 or 12.

14. The coated substrate of claim 13 wherein the substrate is selected from the group consisting of: glass, ceramic, plastic, rubber, elastomer, wood, and metal.

15. The coated substrate of claim 13 wherein the fluoropolymer is selected from the group consisting of: a copolymer of tetrafluoroethylene and bis 2,2-(trifluoromethyl)-4,5-difluoro-1,3-dioxole; a copolymer of tetrafluoroethylene and hexafluoropropylene; and a copolymer of tetrafluoroethylene and a perfluoroalkylvinylether.

* * * * *